(12) United States Patent
Ben-Tsion (10) Patent No.: US 9,612,770 B2
(45) Date of Patent: Apr. 4, 2017

(54) SNAPSHOT MANAGEMENT USING EXTENDED DATA UNITS

(71) Applicant: Infinidat LTD., Herzliya (IL)

(72) Inventor: Ido Ben-Tsion, Ness-Ziona (IL)

(73) Assignee: INFINIDAT LTD., Herzliya (IL)

( * ) Notice: Subject to any disclaimer, the term of this patent is extended or adjusted under 35 U.S.C. 154(b) by 165 days.

(21) Appl. No.: 14/322,961

(22) Filed: Jul. 3, 2014

(65) Prior Publication Data

US 2016/0004453 A1 Jan. 7, 2016

(51) Int. Cl.
*G06F 3/06* (2006.01)

(52) U.S. Cl.
CPC .............. *G06F 3/065* (2013.01); *G06F 3/067* (2013.01); *G06F 3/0608* (2013.01); *G06F 3/0619* (2013.01); *G06F 3/0638* (2013.01); *G06F 3/0671* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 7,373,366 B1* | 5/2008 | Chatterjee | G06F 11/1451 |
| 9,189,495 B1* | 11/2015 | Hughes | G06F 17/30194 |
| 2008/0270719 A1* | 10/2008 | Cochran | G06F 11/1435 711/162 |
| 2008/0288678 A1* | 11/2008 | Nakagawa | G06F 3/0608 710/68 |
| 2009/0024578 A1* | 1/2009 | Wang | G06F 17/30421 |

* cited by examiner

*Primary Examiner* — Yaima Rigol
(74) *Attorney, Agent, or Firm* — Reches Patents (57) ABSTRACT

A method for memory management, the method may include receiving an updated portion of a data unit, the data unit is associated with a logical data entity; wherein the updated portion is smaller than a granularity of a mapping data structure used for retrieval of the data unit; and creating, by the storage system an extended data unit that comprises (i) an original content of the data unit, (ii) the updated portion and, (iii) updated portion metadata; wherein the updated portion metadata comprises (a) updated portion retrieval information for retrieving the updated portion, and (b) updated portion snapshot information indicative of at least one snapshot associated with the updated portion.

18 Claims, 8 Drawing Sheets

SNAPSHOT MANAGEMENT USING EXTENDED DATA UNITS

BACKGROUND

Snapshot is a technique being used to capture the state of a logical volume at a given point in time. Typical snapshot techniques implement a shared copy of the data that is used by both the source (original) logical volume and the snapshot that was taken from the logical volume. Both the source logical volume and the snapshot can share the same physical addresses until the content of the logical volume (or of the snapshot, if the snapshot is writable) is updated.

When updating data of the source logical volume, there is a need to preserve the original content of the source logical volume that is still being used by the snapshot.

According to one technique, called copy-on-write, the content of the address range to be updated is copied to a new physical space before being overwritten by new data of the source volume, and the new physical space where the original content was copied to, from now on, is associated only with the snapshot and not shared with the source volume anymore.

According to another technique, called redirect-on-write, the updated content is written to a new physical space, and the mapping of the source logical volume, with regard to the address range of the updated content, is changed so as to address the new physical space, while the snapshot continues to refer to the old address range.

In either case, after the update, the source logical volume and the snapshot no longer share a physical copy of the changed blocks and both use different address mapping so as to refer to different contents.

Storage systems that implement virtualization layers employ data structures for mapping logical address ranges within the logical address space (of e.g., logical volumes), into physical storage space, which may be either the actual space in the storage device or space represented by a lower layer of virtualization.

The storage and retrieval of data units required address translation such as virtual address to physical address translation. The mapping data structure has a granularity—a smallest size of a data unit that can have its virtual address translated to a physical address. Such a data unit may be regarded as an atomic data unit.

A non-limiting example of a size of an atomic data unit is 64 Kbytes. In this case the mapping data structure may translate addresses of contiguous ranges of data units that are multiplicities of 64 Kbytes from a logical address space (e.g. a logical volume) to the physical storage space.

In a case where snapshots were taken from a source logical volume, writing to a certain logical address range of the logical volume, requires copying the content of the certain logical address range, so as to preserve the old (original) data for the snapshots that share this data.

In addition, it is required to add additional mapping information to the mapping data structure so as to map the certain logical address range to two different locations in the physical storage space. If before the writing, the logical volume shared the same content of the certain logical address range with its snapshots, and the mapping indicated that the logical address, e.g., denoted as LBA1, is mapped to physical address, e.g., denoted as PA1, then after the writing, the duplicated content occupies not only double disk space, but also additional mapping space so as to support two mappings: LBA1 to PA1 and LBA1 to a new allocated physical address.

The duplication of mapping information occurs whether a distinct mapping data structure is used per each of the snapshots and the volume or when all the snapshots and the source logical volume use a single mapping data structure (wherein each logical address range is mapped to a plurality of physical address ranges for different snapshots).

The granularity of the mapping may be much rougher than the requested writing size. For example, writing may be requested in blocks of e.g., 512 Bytes, while the mapping granularity may be of 64K bytes. Thus, writing 512 bytes to a portion of a data unit of 64K bytes that is shared with snapshots causes duplicating the whole data unit, instead of duplicating only the written block.

Upon writing to small address ranges (smaller than the size of mapping units) of a volume having snapshots, there is a need, to: (i) avoid duplicating an entire data unit; and (ii) avoid adding extra mapping information to a mapping data structure having a granularity that corresponds to the size of an atomic data unit for each snapshot.

SUMMARY

According to an embodiment of the invention various methods may be provided and are described in the specification. According to various embodiments of the invention there may be provided a non-transitory computer readable medium that may store instructions for performing any of the methods described in the specification and steps thereof, including any combinations of same. Additional embodiments of the invention include a mass storage arranged to execute any or all of the methods described in the specification above, including any stages—and any combinations of same.

According to an embodiment of the invention there may be provided a method that may include receiving, by a storage system, an updated portion of a data unit, the data unit is associated with a logical data entity; wherein the updated portion is smaller than a granularity of a mapping data structure used for retrieval of the data unit; creating, by the storage system an extended data unit that may include (i) an original content of the data unit, (ii) the updated portion and, (iii) updated portion metadata; wherein the updated portion metadata may include (a) updated portion retrieval information for retrieving the updated portion, and (b) updated portion snapshot information indicative of at least one snapshot associated with the updated portion.

The method may include preventing storing of both (a) the original content of the data unit and (b) an updated data unit in which the updated portion replaces a previous portion of the data unit.

The method may include preventing storing of metadata for retrieval of both (a) the original content of the data unit and (b) an updated data unit in which the modified portion replaces a previous portion of the data unit.

The method may include appending, to the original content of the data unit, the updated portion and the updated portion metadata.

The method may include retrieving, in response to a request to receive an updated data unit, the extended data unit by utilizing extended data unit retrieval information from the mapping data structure; extracting from the extended data unit the updated portion retrieval information; and extracting from the extended data unit at least one updated portion pointed by the updated portion retrieval information.

The method may include reconstructing an update data unit using the updated portion.

The method may include compressing the extended data unit to provide a compressed extended data unit.

The size of the compressed extended data unit may not exceed a size of the original content of the data unit.

The extended data unit may include an extended data unit indicator.

According to an embodiment of the invention there may be provided a method for data management, the method may include receiving, by a storage system, an updated portion of a data unit that is associated with a logical data entity; wherein the updated portion is smaller than a granularity of a mapping data structure used for retrieval of the data unit; selecting, by the storage system, whether to include the updated portion in an extended data unit or in an updated data unit; creating, by the storage system and if selecting to include the updated portion in the extended data unit, the extended data unit, wherein the extended data unit may include (i) an original content of the data unit, (ii) the updated portion, and (iii) updated portion metadata, wherein the updated portion metadata may include (a) updated portion retrieval information for retrieving the updated portion, and (b) updated portion snapshot information indicative of at least one snapshot associated with the updated portion; and wherein if selecting to include the updated portion in the updated data unit, then creating, by the storage system, an updated data unit by replacing a previous portion of the data unit by the updated portion; and storing, by the storage system, both the updated data unit and an original data unit that may include the original content of the data unit and does not include any updated portion.

The method may include appending to the original content of the data unit the updated portion and the updated portion metadata.

The method may include retrieving, in response to a request to receive the extended data unit, the extended data unit by utilizing extended data unit retrieval information from the mapping data structure; extracting from the extended data unit at least one updated portion pointed by the updated portion retrieval information; and retrieving the updated portion using the updated portion retrieval information.

The method may include compressing the extended data unit to provide a compressed extended data unit.

The size of the compressed extended data unit may or may not exceed a size of the original content of the data unit.

According to an embodiment of the invention there may be provided a non-transitory computer readable medium that stores instructions that once executed by a processor of a storage system causes the processor to perform the stages of receive an updated portion of a data unit, the data unit is associated with a logical data entity; wherein the updated portion is smaller than a granularity of a mapping data structure used for retrieval of the data unit; create an extended data unit that may include (i) an original content of the data unit, (ii) the updated portion and, (iii) updated portion metadata; wherein the updated portion metadata may include (a) updated portion retrieval information for retrieving the updated portion, and (b) updated portion snapshot information indicative of at least one snapshot associated with the updated portion.

According to an embodiment of the invention there may be provided a non-transitory computer readable medium that stores instructions that once executed by a processor of a storage system causes the processor to perform the stages of receive an updated portion of a data unit that is associated with a logical data entity; wherein the updated portion is smaller than a granularity of a mapping data structure used for retrieval of the data unit; select whether to include the updated portion in an extended data unit or in an updated data unit, create if selecting to include the updated portion in the extended data unit, the extended data unit, wherein the extended data unit may include (i) an original content of the data unit, (ii) the updated portion, and (iii) updated portion metadata, wherein the updated portion metadata may include (a) updated portion retrieval information for retrieving the updated portion, and (b) updated portion snapshot information indicative of at least one snapshot associated with the updated portion; and wherein if selecting to include the updated portion in the updated data unit, then: create an updated data unit by replacing a previous portion of the data unit by the updated portion; and participate in storing both the updated data unit and an original data unit that may include the original content of the data unit and does not include any updated portion.

According to an embodiment of the invention there may be provided a storage system may include a processor; wherein the processor is arranged to receive an updated portion of a data unit, the data unit is associated with a logical data entity; wherein the updated portion is smaller than a granularity of a mapping data structure used for retrieval of the data unit; and to create an extended data unit that may include (i) an original content of the data unit, (ii) the updated portion and, (iii) updated portion metadata; wherein the updated portion metadata may include (a) updated portion retrieval information for retrieving the updated portion, and (b) updated portion snapshot information indicative of at least one snapshot associated with the updated portion.

According to an embodiment of the invention there may be provided a storage system may include a processor and a permanent storage layer; wherein the processor is arranged to receive an updated portion of a data unit that is associated with a logical data entity; wherein the updated portion is smaller than a granularity of a mapping data structure used for retrieval of the data unit; select whether to include the updated portion in an extended data unit or in an updated data unit; wherein if selecting to include the updated portion in the extended data unit, create the extended data unit, wherein the extended data unit may include (i) an original content of the data unit, (ii) the updated portion, and (iii) updated portion metadata, wherein the updated portion metadata may include (a) updated portion retrieval information for retrieving the updated portion, and (b) updated portion snapshot information indicative of at least one snapshot associated with the updated portion; wherein the permanent storage layer is arranged to store the extended data unit; wherein if selecting to include the updated portion in the updated data unit, then the processor is arranged to create an updated data unit by replacing a previous portion of the data unit by the updated portion; and wherein the permanent storage layer is arranged to store both the updated data unit and an original data unit that may include the original content of the data unit and does not include any updated portion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There are provided, systems, methods and non-transitory computer readable media for managing snapshots using extended data units.

Upon updating a portion of a data unit that is shared between a source logical volume and its snapshots, instead of copying the whole data unit (so as to preserve the original content of the original data unit) and modifying the certain portion (to provide a modified portion) within one of the copies of the data unit (to provide an updated data unit in which the updated portion overrides an older portion), the new content of the portion (updated data portion) is appended to the original data unit and written as one unit (extended data unit) to the disk.

Updated portion metadata may be created to enable a reconstruction of the updated data unit and may also be appended to the original data unit.

The updated portion metadata may include at least one out of (a) an offset within the extended data unit to the start or the end of the original portion that should be updated, (b) a size of the updated portion and (c) applicable snapshot identifiers (snapshots that should be associated with the updated data unit portion). Instead of using size and a single offset, a pair of offsets may be used for pointing to the start and end of the original portion that should be updated.

The updated portion metadata can be stored in conjunction with the updated data portion—as a part of the extended data unit, instead of consuming space of the principal mapping metadata (a data structure that maps logical addresses into physical addresses), which may be an expensive resource, as it is preferably stored in a memory that provides a faster access (e.g. RAM, SSD) than disks that stores the data.

It is noted that the updated portion metadata may be located before the original data unit content, after the original data unit content, both after and before the original data unit content, before any of the updated data unit portions, after any of the updated data unit portions, or both after and before one or more of the updated data unit portions.

Figure 1:
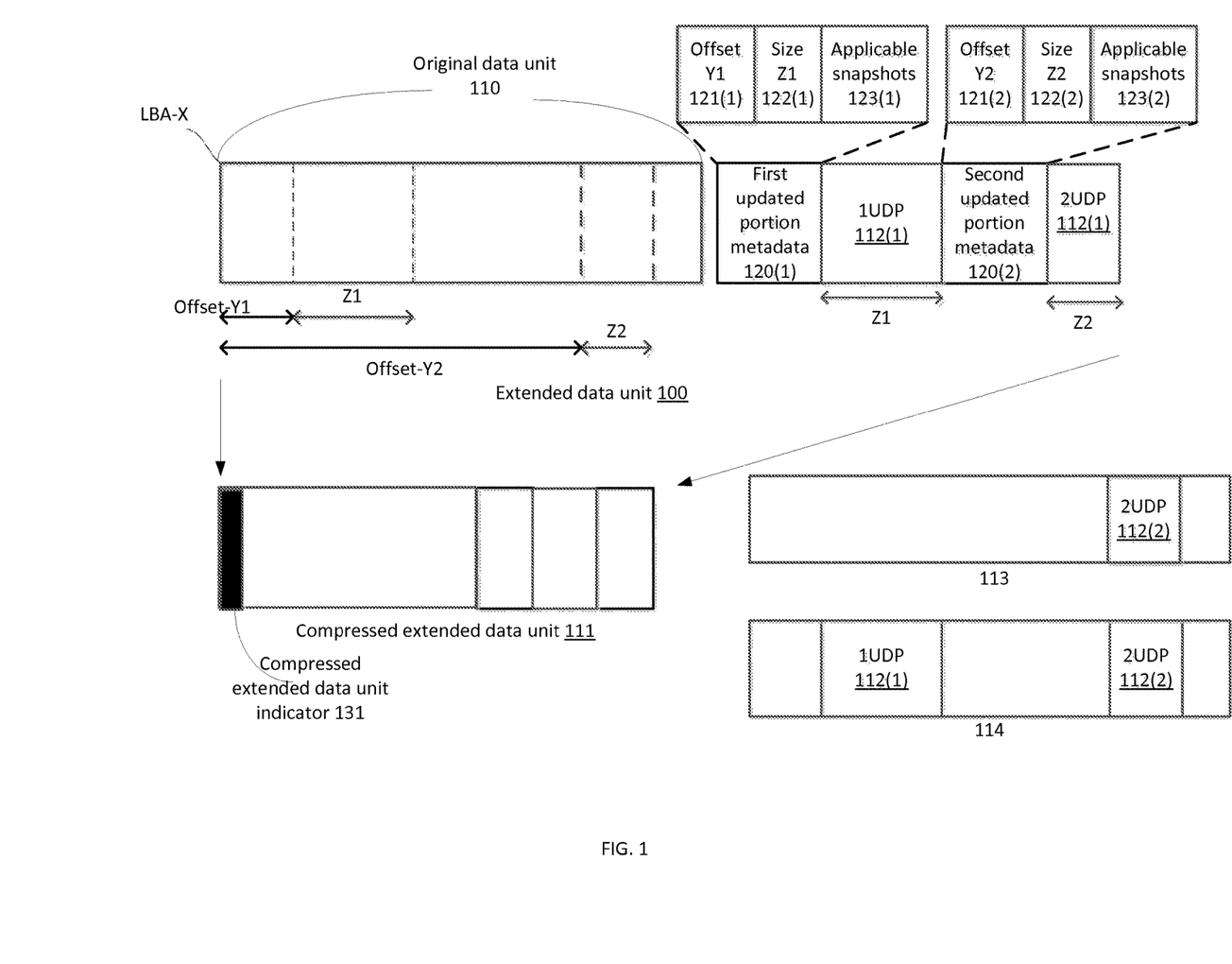
FIG. 1 illustrates an extended data unit, a compressed extended data unit and modified data units according to an embodiment of the invention.
Figure 2:
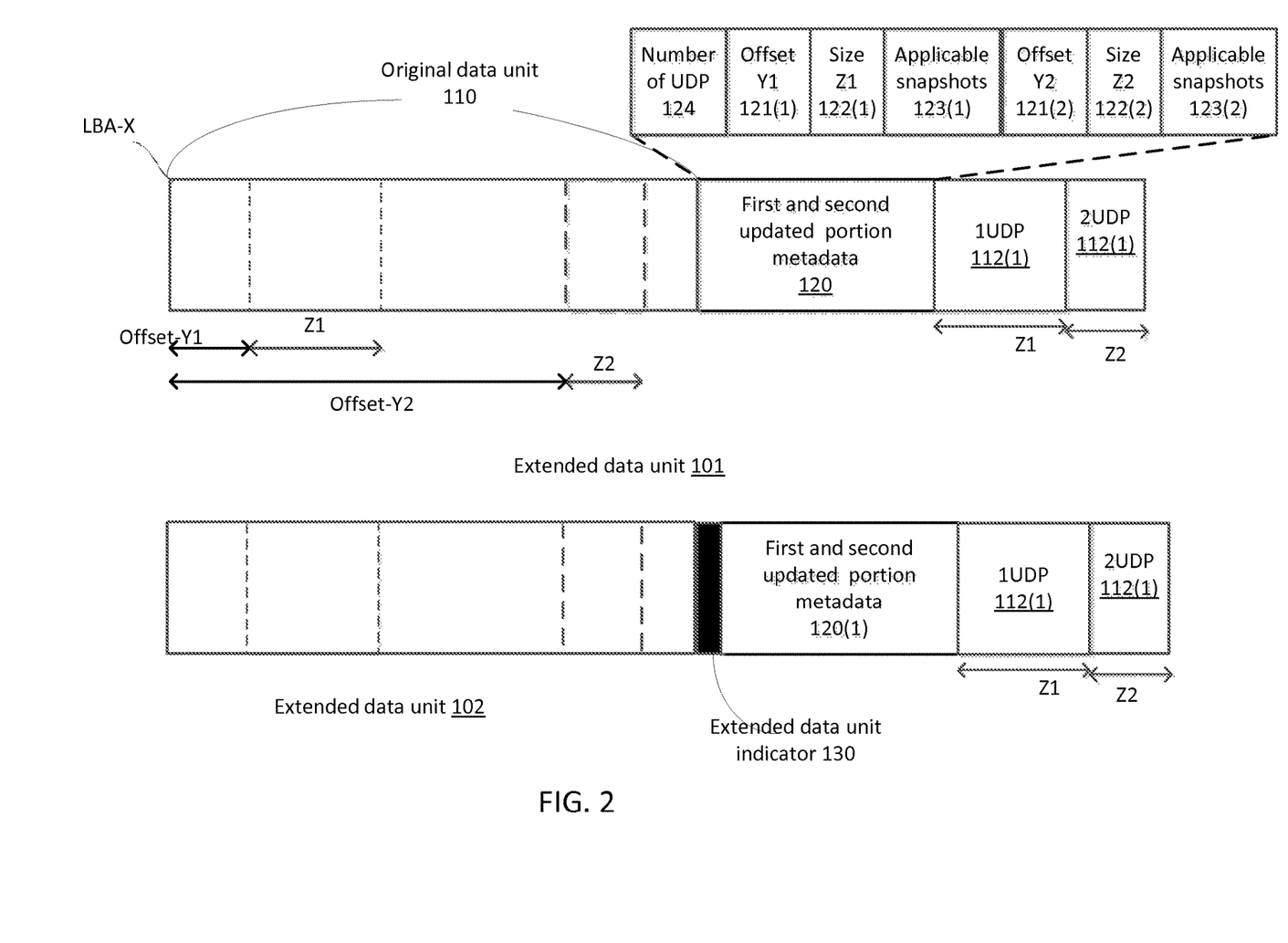
FIG. 2 illustrates extended data units according to various embodiments of the invention.

It is further noted that if multiple updated data portions exist then updated portion metadata related to different updated data portions may be combined, may be split, may be stored in a consecutive or non-consecutive manner and the like. FIG. 1 illustrated an extended data unit 100 in which the different updated portion metadata (related to different updated data portions) is split to first updated portion metadata 120(1) and second updated portion metadata 120(2). FIG. 2 illustrates an extended data unit 101 in which the different updated portion metadata (related to different updated data portions) are combined to provide first and second updated portion metadata 120.

FIG. 1 illustrates extended data unit 100, compressed extended data unit 111 and modified data units 113, 114 and 115 according to an embodiment of the invention.

Extended data unit 100 may include updates related to multiple members of a snapshot family that include a source volume and one or more snapshots and clones (writable snapshots) that were taken from the source volume.

Extended data unit 100 includes an original data unit 110, which may include the original content of the data unit (original data unit), before being updated or alternatively, original data unit 110 may refer to content applicable to the source volume. The original data unit 110 may be of a size of the granularity of a mapping data structure (e.g., 64 KByte).

Extended data unit 100 further includes one or more updated data unit portions such as first and second updated data unit portions 1UDP 112(1) and 2UDP 112(2).

Each updated data unit portion is of a variable size, which maybe as small as one byte and should be smaller than the size of the original data unit (otherwise, the regular duplication technique of the whole data unit can be implemented).

A maximum size of an updated data unit portion that may trigger a creation of an extended data unit may be limited size threshold such as a certain fraction (e.g. 50%) of the size of the original data unit. It is noted that the size threshold may be set to a different fraction of the size of the original data unit.

FIG. 1 illustrates first updated data unit portion 1UDP 112(1) of size Z1 which is bigger than a size Z2 of second updated data unit portion 2UDP 112(2). Z1 and Z2 are smaller than a certain fraction (e.g. 50%) of the granularity of a mapping data structure.

The extended data unit 110 may also include updated portion metadata that may be used for rebuilding an updated data unit for a certain snapshot or volume.

The updated portion metadata may accompany each updated data unit portion, such as first updated portion metadata 120(1) that corresponds to first updated data unit portion 112(1) and second updated portion metadata 120(2) that corresponds to second updated data unit portion 112(2).

First updated portion metadata 120(1) includes:
a. Offset 121(1) (having a value of Y1) within data unit 110 of a first original data unit portion that is to be modified by the first updated data unit portion 112(1).
b. Size 122(1) (having a value of Z1) of the first updated data unit portion 112(1).
c. Updated portion snapshot information 123(1) indicative of one or more snapshots that are associated with the first updated data unit portion 112(1).

Second updated portion metadata 120(2) includes:
a. Offset 121(2) (having a value of Y2) within data unit 110 of a second original data unit portion that is to be modified by the second updated data unit portion 112(2).
b. Size 122(2) (having a value of Z2) of the second updated data unit portion 112(2).
c. Updated portion snapshot information 123(2) indicative of one or more snapshots that are associated with the second updated data unit portion 112(2).

The snapshots associated with updated data unit portion 112(1) may be the same snapshots associated with updated data unit portion 112(2) or different from those snapshots.

In the following examples, it is assumed that first updated data unit portion 112(1) is associated with snapshots S1, while second updated data unit portion 112(2) is associated with snapshots S1 and S2.

FIG. 1 illustrates two updated data units, which are variants of data unit 110 and include the original data unit 110 with one or more overwritten portions.

A first updated data unit 113 can be created with second updated data unit portion 112(2) overwriting a portion that starts in offset 121(2)=Y2.

First updated data unit 113 may be created upon a request to read the data unit that starts on address LBAx of snapshot S2.

A second updated data unit 114 can be created with both first and second updated data unit portions 112(1) and 112(2) overwriting respective portions.

Second updated data unit 114 may be created upon a request to read the data unit that starts on address LBAx of snapshot S1.

Few metadata fields may be added to the principal mapping metadata (for mapping the original data unit), for example, an indicator for whether a specific logical-to-physical mapping is pointing to a physical address that stores an extended data unit (or otherwise stores a regular data unit) and the size of the extended data unit. Alternatively, the principal mapping data structure may be ignorant with regard to the structure of the content in the physical address and whether it includes a regular data unit or an extended data unit. In this case, any indication regarding the type (regular or extended, compressed or not) of the data unit is stored within the extended data unit, for example, FIG. 2 illustrates an extended data unit indicator 130 within the extended data unit 102 itself that indicates that extended data unit 102 is an extended data unit.

The size of extended data unit 100 may be larger than original data unit 110, but in case of using compression before storing the extended unit, the size of the compressed extended data unit (see compressed extended data unit 111 of FIG. 1) maybe similar to the uncompressed size of the basic data unit and thus the stored units can retain the fixed size of the mapping units, e.g. 64 Kbytes. Any (especially lossless) compressing technique known in the art may be used for the compression.

FIG. 1 illustrates a positioning of updated portion metadata related to different updated portions at different locations. It is noted that metadata related to multiple updated portions may be grouped together—as illustrated in FIG. 2.

In FIG. 2 updated portion metadata 120 relates to first and second updated data unit portions 112(1) and 112(2).

FIG. 2 illustrates the updated portion metadata 120 as including:
a. Number of updated portions indicator 124 (number of updated portions).
b. Offset 121(1) (having a value of Y1) within data unit 110 of a first original data unit portion that is to be modified by the first updated data unit portion 112(1).
c. Size 122(1) (having a value of Z1) of the first updated data unit portion 112(1).
d. Updated portion snapshot information 123(1) indicative of one or more snapshots that are associated with the first updated data unit portion 112(1).
e. Offset 121(2) (having a value of Y2) within data unit 110 of a second original data unit portion that is to be modified by the second updated data unit portion 112(2).
f. Size 122(2) (having a value of Z2) of the second updated data unit portion 112(2).
g. Updated portion snapshot information 123(2) indicative of one or more snapshots that are associated with the second updated data unit portion 112(2).

Handling Write Request

Upon writing new data (updated data portion) to a logical address, (e.g., LBAx, or LBAx plus an offset smaller than e.g. 64 Kbytes) of a writable snapshot or to a source volume that has snapshots, it can be determined whether to use the extended data unit approach, based on the size of the updated data portion to be written. The size may be compared to a size threshold, which may be a fraction of the size of the original data unit (e.g., 50% or any other number between 1%-99%).

The extended data unit may be created in cases where the size of the updated data portion to be written does not exceed the size threshold.

If the size of the updated data portion exceeds the size threshold, then the regular processes of copying the entire data unit and storing both the original data unit and an updated data unit may be applied.

Alternatively, the extended data unit approach can be implemented in any case, especially when compression is being used.

Additionally or alternatively, the determination of which approach to select may depend upon an aggregate size of updated data unit portions associated with a data unit and/or a number of updated data unit portions and/or an aggregate size of a combination of one or more updated data unit and one or more associated updated portion metadata.

If determining to create an extended data unit than the original data unit may be read to a cache memory of the storage system (if not cached already), but instead of overwriting the original portion to be updated with the new data (to provide an updated data unit), one of the following embodiments can be implemented so as to preserve the previous content of the portion.

According to one embodiment, the original data unit remains intact and the updated data unit portion may be appended to the original data unit. According to another embodiment, in certain cases, for example when the write request is directed to the source volume of the snapshot family that shares the content of the original data unit with at least one snapshot, data unit 110 can reflect the current state of the source volume, so the previous content of the addressed portion within the data unit is copied before being overwritten, in a manner similar to a copy-on-write approach, so as to preserve the previous content for the sake of the at least one snapshot, and the addressed portion is overwritten with the new data. The previous content of the portion can be appended to the data unit and the at least one snapshot is associated with the previous content of the portion being updated.

In addition, the updated portion metadata for the rebuilding of an updated data unit may be also appended to the original data unit to provide the extended data unit. The updated portion metadata may include parameters, such as the size of the new data, the position within the data unit and applicable volume members of a snapshot family (snapshots or original volume).

The position may be an offset from the start of the data unit (calculated as the difference between data unit start address and the logical address requested for the new data).

The extended data unit may be then written to a non-volatile storage (for example a permanent storage entity of the storage system), and this writing may be executed as one unit in one I/O operation or in more than one unit in a set of consecutive and/or sequential I/O operations.

Conveniently, no separate mapping has to be added for the updated data portion in the mapping data structure, though optionally, some parameters may be added to the mapping data structure, for example to indicate that the mapped address includes an extended data unit and the size of the updated data unit. If the extended data unit is compressed to the size (or less than the size) of the mapping units, then such indication may be omitted from the mapping data structure. If before the data update, the mapping data structure indicated that the logical volume and all the snapshots shares a physical address PAx that is mapped to logical address LBAx, after the creation of the extended data unit, the mapping data structure may remain unchanged, i.e., it still indicates that physical address PAx is mapped to logical address LBAx (and vice versa), for the logical volume and all its snapshots, even though the snapshots no longer share the entire content of the data unit in LBAx.

Handling Read Request

When receiving a request to read a data unit from a certain logical address of a family member (snapshot or a logical volume that has snapshots), the extended data unit is read to a cache memory.

Since the updated data unit portions (first and second updated data unit portions and updated portion metadata 120(1) and 120(2)) of extended data unit 100 are stored in consecutive physical addresses (or in a predefined manner in relation to the original data unit), the entire extended data unit may be read in a single I/O operation or in a set of consecutive and/or sequential I/O operations. The mapping data structure may indicate that the requested address range includes an extended data unit of a certain size.

Alternatively, the extended data unit can be compressed to a size of the original data unit (or less), and the information to interpret the extended data unit is stored in the beginning (or in another known location) of the extended data unit—as illustrated by compressed extended data unit indicator 131 of FIG. 1.

The updated data portions related to a member to be read are then identified and used to overwrite the respective original content located at retrieved offset(s) in the original data unit.

Suppose a read request is issued for a data unit starting at logical address LBAx of a snapshot S2.

Referring to FIG. 1—second updated portion metadata 120(2) reveals that snapshot S2 is indicated as applicable snapshot of second updated data unit portion 112(2), having a size Z2, as indicated in field size 122(2) and should overwrite original content that starts at offset Y2, as indicated in field offset 121(2). Updated data unit 113 illustrates data unit 110 after being modified with second updated data unit portion 112(2).

Figure 3:
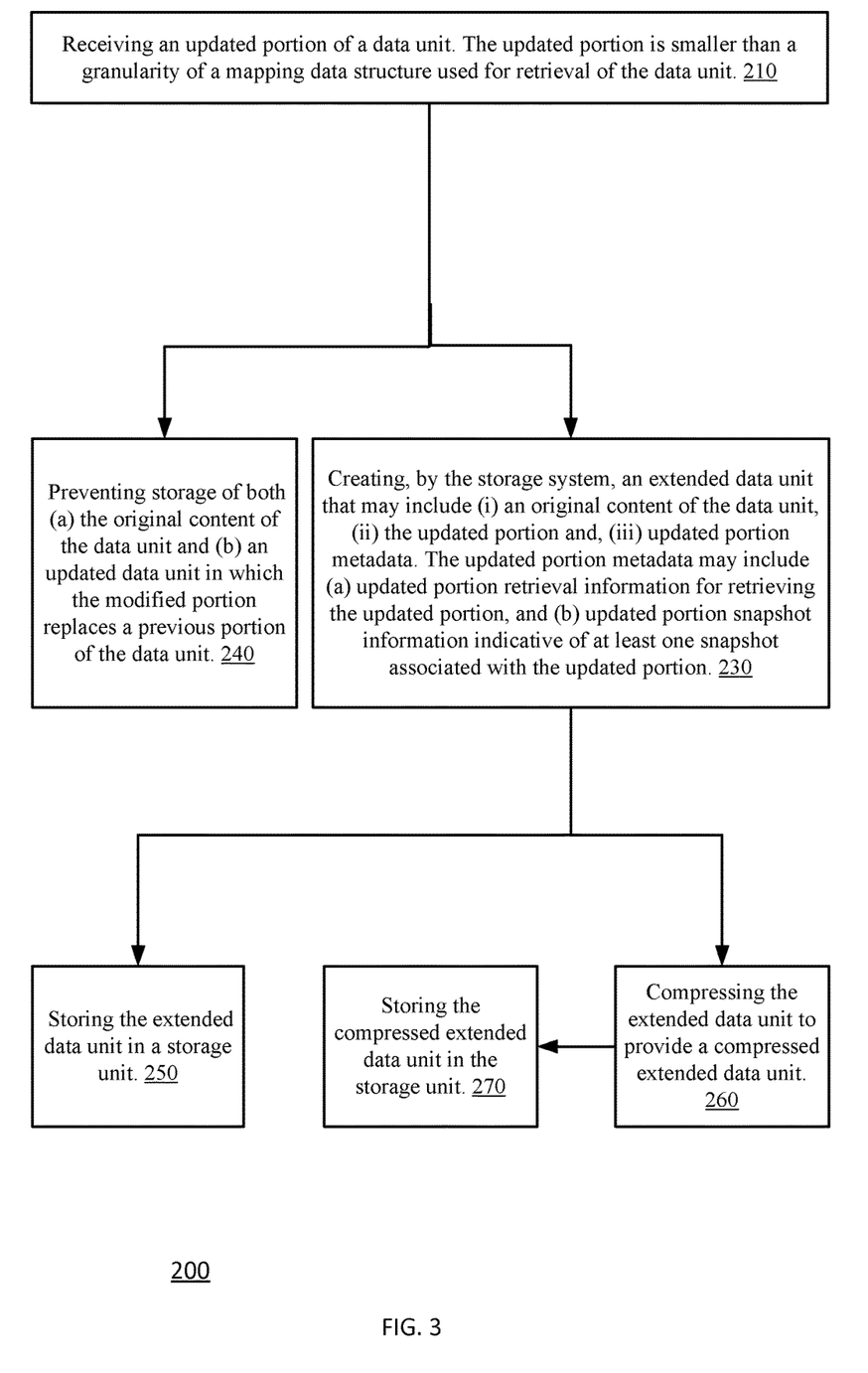
FIG. 3 illustrates a flow chart according to an embodiment of the invention.

FIG. 3 illustrates method 200 according to an embodiment of the invention.

Method 200 may start by stage 210 of receiving an updated portion of a data unit. The data unit is associated with a logical data entity (such as but not limited to a logical volume or a writable snapshot). The updated portion is smaller than a granularity of a mapping data structure used for retrieval of the data unit. The data unit that includes the updated portion is further associated with a logical address within the logical data entity and the mapping data structure includes metadata used for retrieval of the data unit (also known as extended data unit retrieval information or data unit retrieval information), such as mapping of the logical address associated with the data unit into a physical address that stores the data unit.

Stage 210 may be followed by stages 230 and/or 240.

Stage 230 may include creating, by the storage system, an extended data unit that may include (i) an original content of the data unit, (ii) the updated portion and, (iii) updated portion metadata. The updated portion metadata may include (a) updated portion retrieval information for retrieving the updated portion, and (b) updated portion snapshot information indicative of at least one snapshot associated with the updated portion. The updated portion snapshot information may be indicative of more than a single snapshot associated with the update. For example—associating a certain snapshot with an updated portion may indicate that snapshots that follow that certain portion are also relevant to that updated portion. Stage 230 may also include creating an extended data unit retrieval metadata that will allow the retrieval of the extended data unit.

Stage 240 may include preventing storing of both (a) the original content of the data unit and (b) an updated data unit in which the modified portion replaces a previous portion of the data unit. Additionally or alternatively, stage 240 may include preventing adding mapping information that maps the logical address to a new physical location, i.e. the mapping of the logical address is into a single physical address for both the logical entity and the certain snapshot (affected by the writing, even though the content is not entirely shared anymore).

Stage 230 may include appending, to the original content of the data unit, the updated portion and the updated portion metadata or otherwise storing the updated portion and the updated portion metadata in a known manner. The updated portion and the updated portion metadata may be placed before the original content of the data unit, after the original content of the data unit, within the original content of the data unit and the like.

Stage 230 may include marking the extended data unit as an extended data unit. This may include adding, setting, resetting or updating extended data unit indicator.

Stages 230 and 240 may be followed by stage 250 or by stage 260.

Stage 250 may include storing the extended data unit in a storage unit.

Stage 260 may include compressing the extended data unit to provide a compressed extended data unit. The size of the compressed extended data unit may not exceed a size of the original content of the data unit. Although the size may exceed the size of the original content.

Stage 260 may include marking the compressed extended data unit as a compressed extended data unit. This may include adding, setting, resetting or updating a compressed extended data unit indicator.

Stage 260 may be followed by stage 270 of storing the compressed extended data unit in the storage unit.

The mentioned above stages of method 200 may be repeated for each updated data unit.

Figure 4:
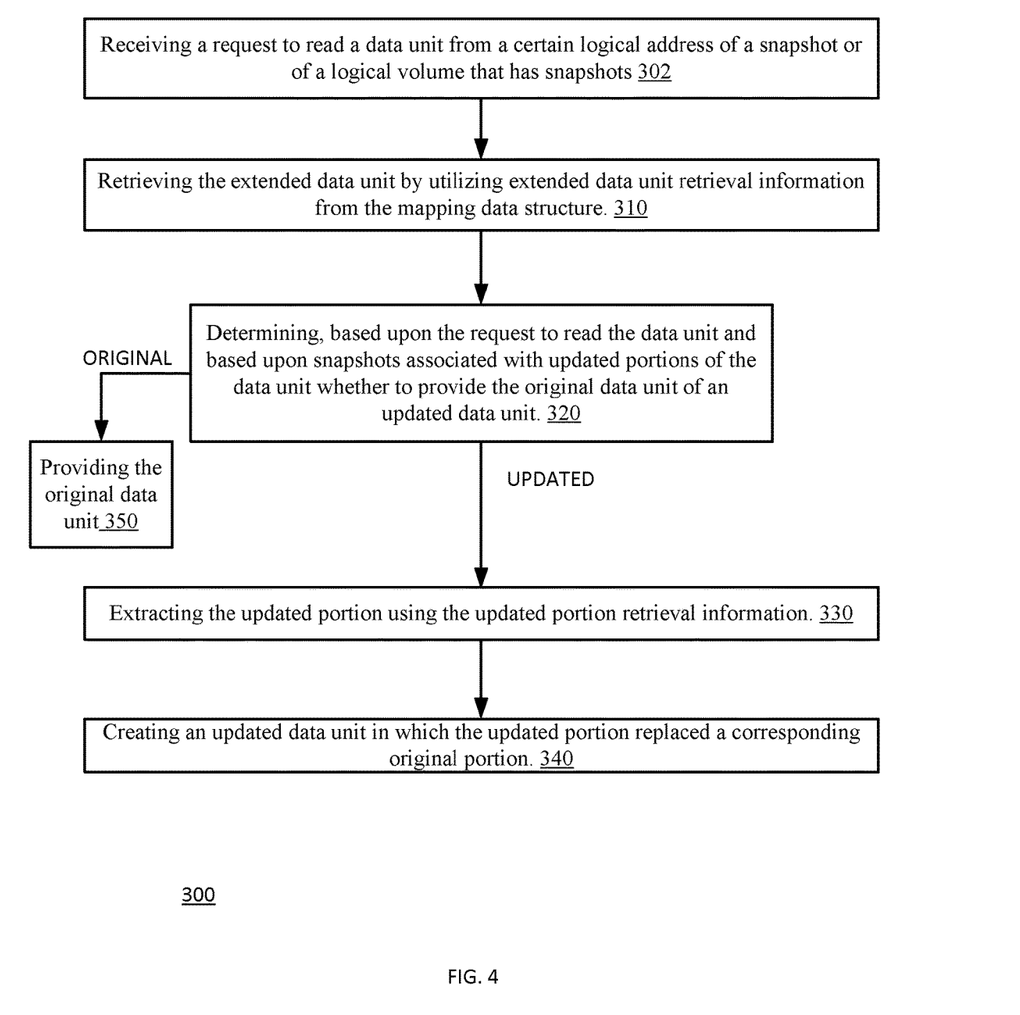
FIG. 4 illustrates a flow chart according to an embodiment of the invention.

FIG. 4 illustrates method 300 according to an embodiment of the invention.

Method 300 may start by stage 302 of receiving a request to read a data unit from a certain logical address of a snapshot or of a logical volume that has snapshots.

Stage 304 may be followed by stage 310 of retrieving the extended data unit by utilizing extended data unit retrieval information from the mapping data structure.

Stage 310 may be followed by stage 320 of determining, based upon the request to read the data unit and based upon snapshots associated with updated portions of the data unit whether to provide the original data unit or an updated data unit.

If, for example, the request is for reading the original data unit then the original data unit is provided (stage 350). If, for example, the request is to receive a certain snapshot then the updated portion metadata of the extended data unit is read to determine whether to provide the original data unit or which updates should be made. For example and referring to FIG. 1, requesting a data unit of snapshot S1 will result in updating the original data unit by 1 UDP 112(1) and 2 UDP 112(2).

Stage 320 may include extracting from the extended data unit updated portion retrieval information of updated portions of the extended data unit.

Stage 320 may be followed by stage 330 of retrieving of one or more updated portions using the updated portion retrieval information.

Stage 330 may be followed by stage 340 of creating an updated data unit in which the one or more updated portion replaced a corresponding one or more original portion.

Figure 5:
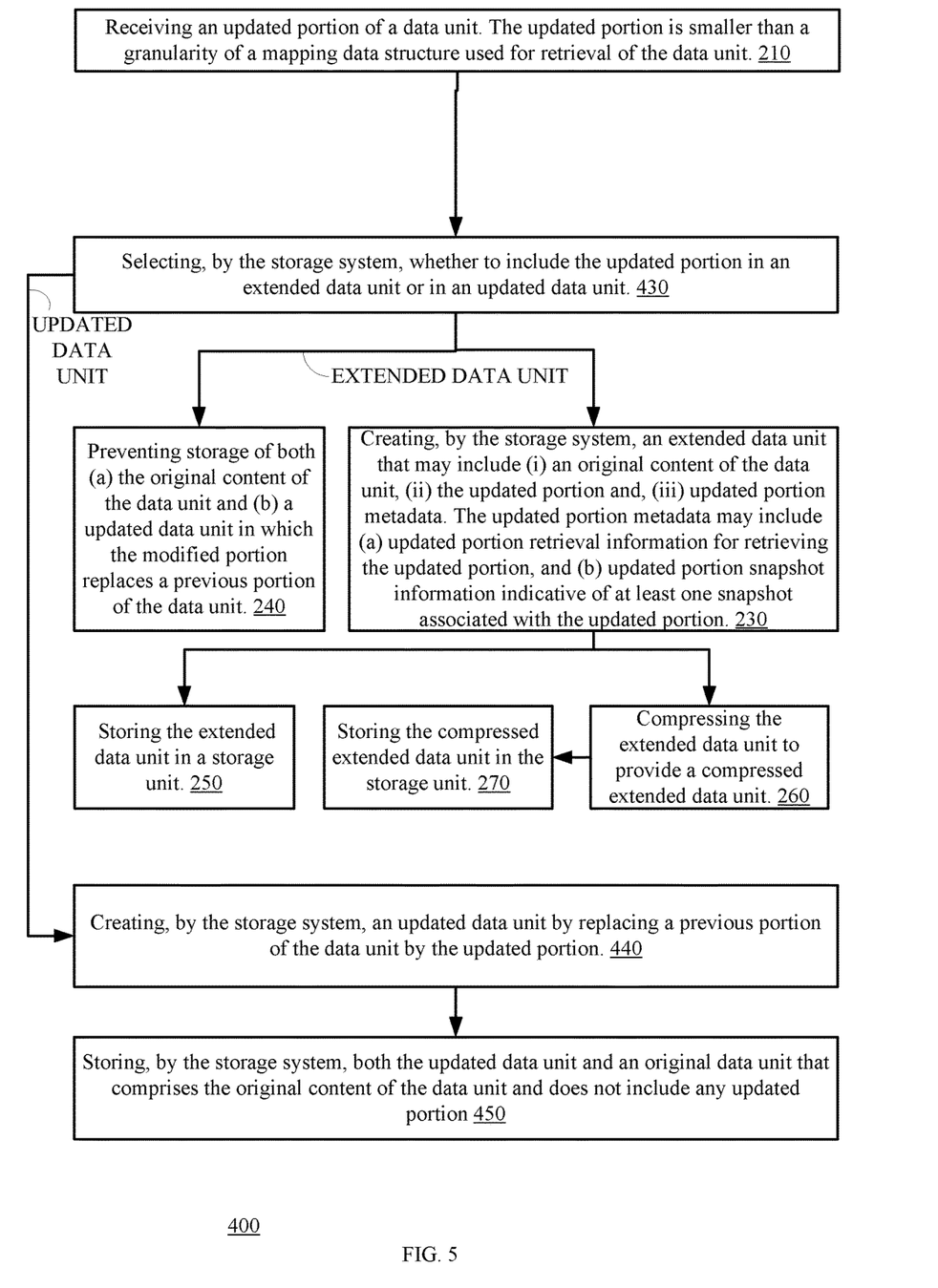
FIG. 5 illustrates a flow chart according to an embodiment of the invention.

FIG. 5 illustrates method 400 according to an embodiment of the invention.

Method 400 may start by stage 210 of receiving, by a storage system, an updated portion of a data unit that is associated with a logical data entity. The updated portion is smaller than a granularity of a mapping data structure used for retrieval of the data unit.

Stage 210 may be followed by stage 430 of selecting, by the storage system whether to include the updated portion in an extended data unit or in an updated data unit.

The extended data unit may be created in cases where the size of the updated data portion to be written does not exceed the size threshold.

If the size of the updated data portion exceeds the size threshold, then the regular processes of copying the entire data unit and storing both the original data unit and an updated data unit may be applied. In this case, the mapping data structure is also updated so as to split mapping of the logical address (previously mapped to a single physical address) into two physical addresses, one for the original data unit and one for the updated data unit.

Alternatively, the extended data unit approach can be implemented in any case, especially when compression is being used.

Additionally or alternatively, the determination of which approach to select may depend upon an aggregate size of updated data unit portions associated with a data unit and/or a number of updated data unit portions and/or an aggregate size of a combination of one or more updated data unit and one or more associated updated portion metadata.

If selecting to include the updated portion in an extended data unit then stage 430 may be followed by stages 230 and 240. Stage 240 may be followed by stages 250 or 260. Stage 260 may be followed by stage 270.

If selecting to include the updated portion in an updated data unit then stage 430 may be followed by stage 440.

Stage 440 includes creating, by the storage system, an updated data unit by replacing a previous portion of the data unit by the updated portion. Step 440 may further includes changing the mapping data structure so as to split the mapping of the logical address (previously mapped to a single physical address) into two physical addresses, one for the original data unit and one for the updated data unit Stage 440 may be followed by stage 450 of storing, by the storage system, both the updated data unit and an original data unit that comprises the original content of the data unit and does not include any updated portion.

Figure 6:
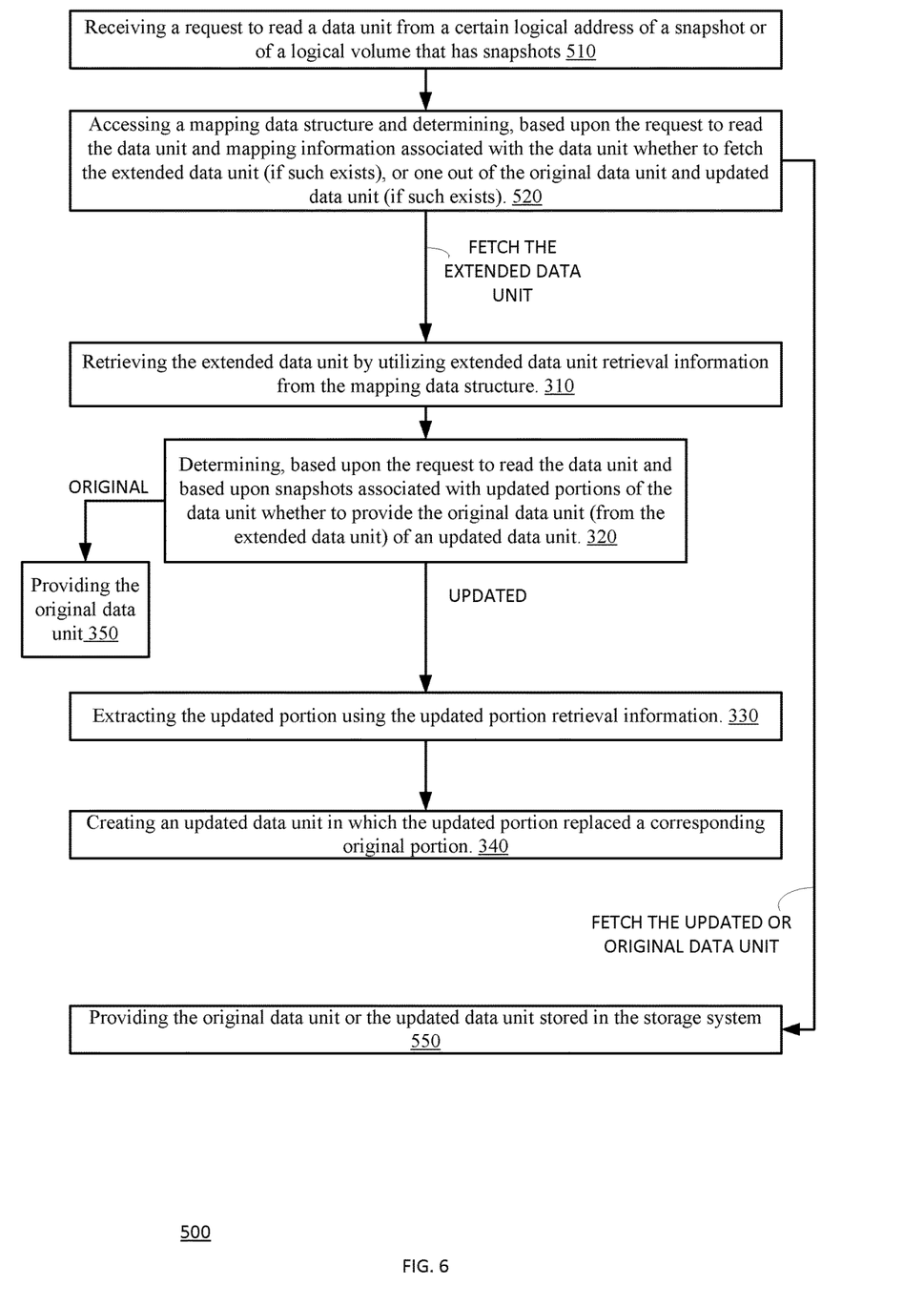
FIG. 6 illustrates a flow chart according to an embodiment of the invention.

FIG. 6 illustrates method 300 according to an embodiment of the invention.

Method 300 may start by stage 510 of receiving a request to read a data unit from a certain logical address of a snapshot or of a logical volume that has snapshots.

Stage 510 may be followed by stage 520 of accessing a mapping data structure and determining, based upon the request to read the data unit and mapping information associated with the data unit whether to fetch the extended data unit (if such exists), or one out of the original data unit and updated data unit (if such exists).

For example, if information about the data unit and its updates are stored in an extended data unit then stage 520 this will be reflected in the mapping data structure (for example—there be only one address associated with the data unit and there may also be an indication about the presence of an extended data unit) and stage 520 will include determining to fetch the extended data unit.

Yet for another example—if different versions of the data unit (original data unit and one or more updated data units)

are stored in the storage unit then the mapping data structure will include multiple addresses for the different versions and stage 520 will include determining to fetch the most appropriate version (according to the snapshot or original version requested in the request).

If determining to fetch the extended data structure then stage 520 may be followed by stage 310. Stage 310 may be followed by stage 320. Stage 320 may be followed by stage 350 (providing the original data unit) or by stage 330 (if determining to generate an updated data unit). Stage 330 may be followed by stage 340.

Figure 7:
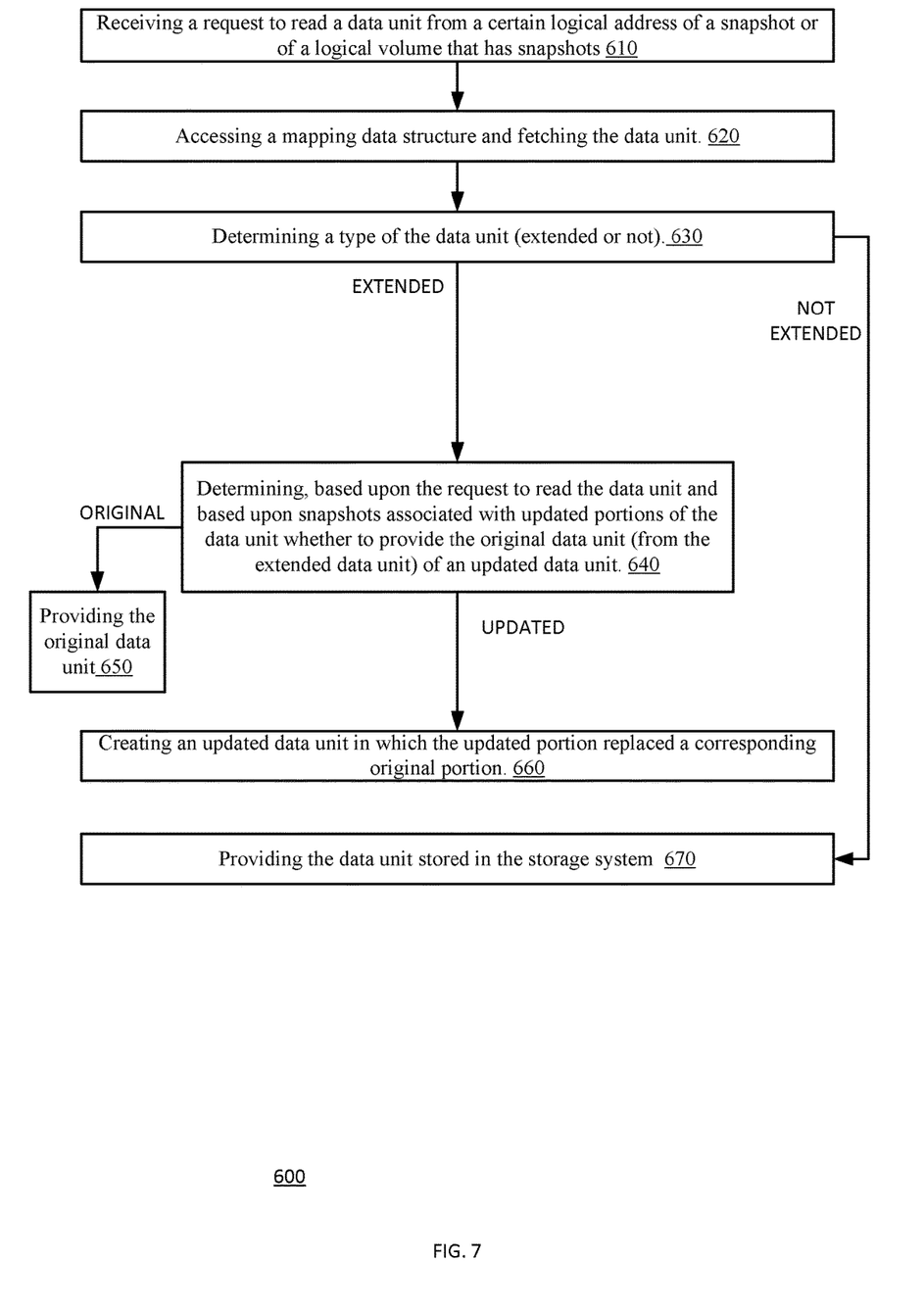
FIG. 7 illustrates a flow chart according to an embodiment of the invention.

FIG. 7 illustrates method 600 according to an embodiment of the invention.

Method 600 may start by stage 610 of receiving a request to read a data unit from a certain logical address of a snapshot or of a logical volume that has snapshots.

Stage 610 may be followed by stage 620 of accessing a mapping data structure and fetching the data unit.

Stage 620 may be followed by stage 630 of determining a type of the data unit (extended or not). The determination may be responsive to the presence or absence of an extended data unit indicator. The extended data unit indicator indicated whether the data unit is an extended data unit or not. The extended data unit indicator can be explicit or implicit. The extended data unit indicator can be included in the extended data unit (see for example FIG. 2) or in another data structure. The extended data unit indicator can be implicit and can be learnt, for example, from the address of the data unit or the address of data unit metadata (in case where extended data units are associated with certain addresses and/or their metadata is stored in certain locations associated with extended data units).

If the data unit is an extended data unit then stage 630 is followed by stage 640. Else-stage 640 is followed by stage 670.

Stage 630 may be followed by stage 640 of determining, based upon the request to read the data unit and based upon snapshots associated with updated portions of the data unit whether to provide the original data unit (from the extended data unit) of an updated data unit.

If determining to provide the original data unit then stage 640 is followed by stage 650 of providing the original data unit.

If determining to provide the updated data unit then stage 640 is followed by stage 660 of creating an updated data unit in which the updated portion replaced a corresponding original portion.

Stage 670 includes providing the data unit (original or updated) stored in the storage system.

Figure 8:
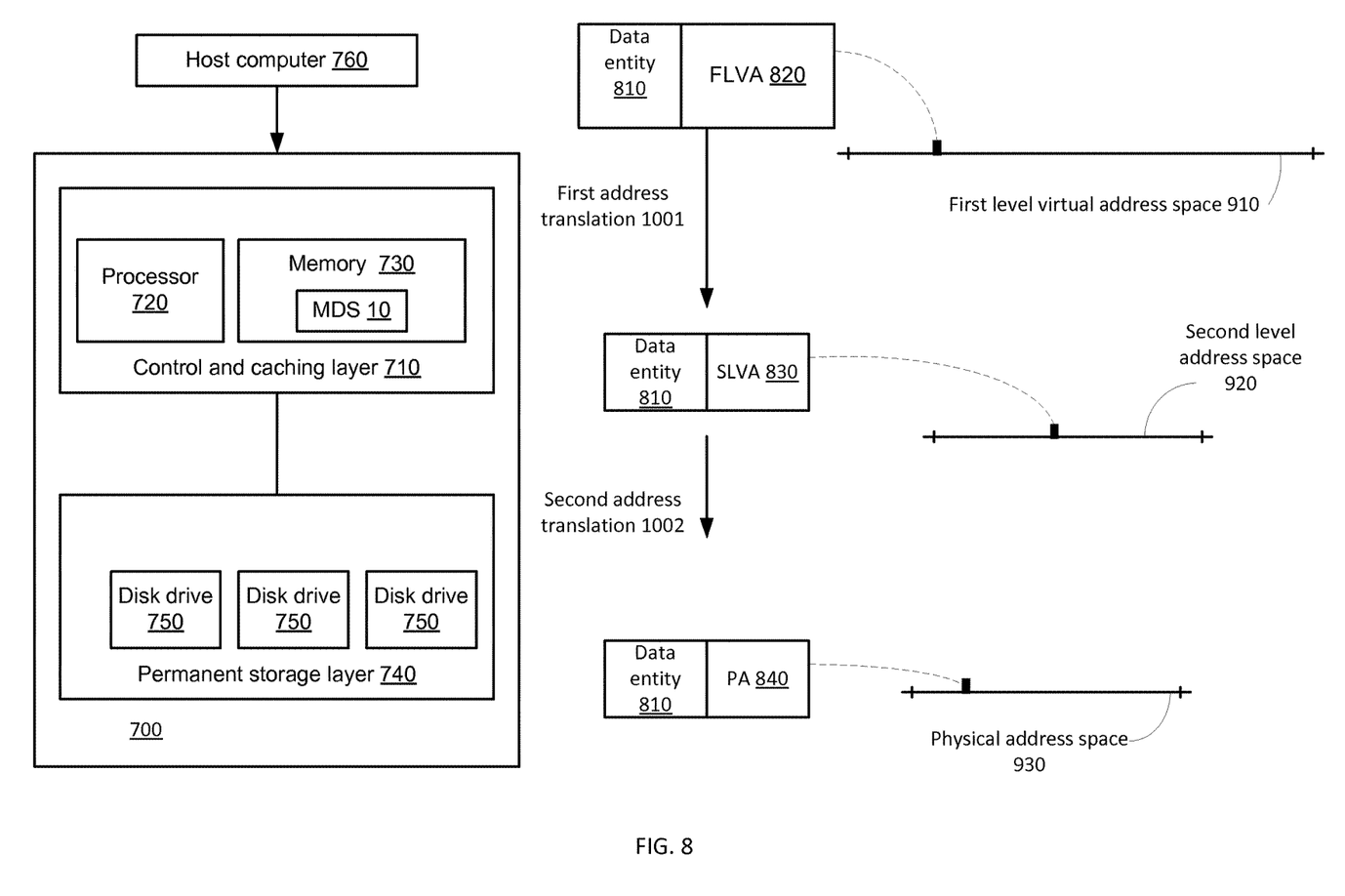
FIG. 8 illustrates a storage system, multiple address spaces and data entities according to an embodiment of the invention.

FIG. 8 illustrates a storage system 700, multiple address spaces 910, 920 and 930 and data entity 810 according to an embodiment of the invention.

The storage system 700 is illustrated as including a control and caching layer 710 and a permanent storage layer 740 that includes multiple disk drives. The control and caching layer 710 is coupled to one or more host computers such as host computer 760. The control and caching layer 710 refers to any arrangement of components that are configured to perform caching and control operations. The permanent storage layer 740 refers to any arrangement of components that are configured to store information in non-volatile memory.

The control and caching layer 710 is illustrated as including a processor 720 and a cache memory 730 and may interface between the host computer (and the first level virtual address space 910) and the permanent storage layer 740 (and its physical address space 930) (and its physical address space 930).

The memory 730 is shown as storing the mapping data structure (MDS) 10.

FIG. 8 illustrates two address translations 1001 and 1002 wherein either one of the address translation may use MDS 10.

The first address translation 1001 is between a first level virtual address (FLVA 821) of a first level virtual address space 910 and a second level virtual address (SLVA 830) of a second level virtual address space 920.

The second address translation 1002 is between a second level virtual address (SLVA 830) of a second level virtual address space 920 and a physical address (PA 840) of a physical address space 930.

Storage system 700 may implement any method illustrated in the specification. The processor 720 may be provided with instructions (such as software, firmware and/or middleware) that once executed by the processor causes the processor 720 to at least participate in the execution of method 200 and/or 400. The processor 720 may be a general purpose processor 720, a dedicated processor (such as a Digital Signal Processor), and the like.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, state bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for memory management, the method comprises:
    receiving, by a storage system, an updated portion of a data unit, the data unit is associated with multiple members of a snapshot family that includes a source volume and one or more snapshots; wherein the updated portion is smaller than a granularity of a mapping data structure used for retrieval of the data unit;
    creating, by the storage system an extended data unit that comprises (i) an original content of the data unit, (ii) the updated portion and, (iii) updated portion metadata; wherein the updated portion metadata comprises (a) updated portion retrieval information for retrieving the updated portion, and (b) updated portion snapshot information indicative of at least one member of the multiple members of the snapshot family that is associated with the updated portion;
    receiving a request to read a certain data unit of a certain member of the snapshot family;
    in response to the receiving of the request to read the certain data unit:
        retrieving a certain extended data unit that corresponds to the certain data unit and comprises updated portions associated with different members of the snapshot family;
        selecting at least one of the updated portions, wherein the selecting is based on an updated portion snapshot information of the at least one of the updated portions; wherein the updated portion snapshot information of the at least one of the updated portions is indicative of the certain member of the snapshot family; and
        creating the certain data unit by using the at least one of the updated portions.

2. The method according to claim 1 comprising preventing storing of both (a) the original content of the data unit and (b) an updated data unit in which the updated portion replaces a previous portion of the data unit.

3. The method according to claim 1 comprising preventing storing of metadata for retrieval of both (a) the original content of the data unit and (b) an updated data unit in which the modified portion replaces a previous portion of the data unit.

4. The method according to claim 1 comprising appending, to the original content of the data unit, the updated portion and the updated portion metadata.

5. The method according to claim 1, comprising:
    retrieving, in response to a request to receive an updated data unit, the extended data unit by utilizing extended data unit retrieval information from the mapping data structure;
    extracting from the extended data unit the updated portion retrieval information; and
    extracting from the extended data unit at least one updated portion pointed by the updated portion retrieval information.

6. The method according to claim 5 comprising reconstructing an update data unit using the updated portion.

7. The method according to claim 1 further comprising compressing the extended data unit to provide a compressed extended data unit.

8. The method according to claim 7 wherein a size of the compressed extended data unit does not exceed a size of the original content of the data unit.

9. The method according to claim 1 wherein the extended data unit comprises an extended data unit indicator.

10. A method for data management, the method comprises:
    receiving, by a storage system, an updated portion of a data unit that is associated with multiple members of a snapshot family that includes a source volume and one or more snapshots; wherein the updated portion is smaller than a granularity of a mapping data structure used for retrieval of the data unit;
    selecting, by the storage system, whether to include the updated portion in an extended data unit or in an updated data unit, based on a size of the updated portion;
    creating, by the storage system and if selecting to include the updated portion in the extended data unit, the extended data unit, wherein the extended data unit comprises (i) an original content of the data unit, (ii) the updated portion, and (iii) updated portion metadata, wherein the updated portion metadata comprises (a) updated portion retrieval information for retrieving the updated portion, and (b) updated portion snapshot information indicative of at least one member of the multiple members of the snapshot family that is associated with the updated portion;
    wherein if selecting to include the updated portion in the updated data unit, then:
        creating, by the storage system, an updated data unit by replacing a previous portion of the data unit by the updated portion; and
        storing, by the storage system, both the updated data unit and an original data unit that comprises the original content of the data unit and does not include any updated portion;
    receiving a request to read a certain data unit of a certain member of the snapshot family;
    in response to the receiving of the request to read the certain data unit:
        retrieving a certain extended data unit that corresponds to the certain data unit and comprises updated portions associated with different members of the snapshot family;
        selecting at least one of the updated portions, wherein the selecting is based on an updated portion snapshot information of the at least one of the updated portions; wherein the updated portion snapshot information of the at least one of the updated portions is indicative of the certain member of the snapshot family; and
        creating the certain data unit by using the at least one of the updated portions.

11. The method according to claim 10 comprising appending to the original content of the data unit the updated portion and the updated portion metadata.

12. The method according to claim 11 further comprising compressing the extended data unit to provide a compressed extended data unit.

13. The method according to claim 12 wherein a size of the compressed extended data unit does not exceed a size of the original content of the data unit.

14. The method according to claim 10, comprising:
retrieving, in response to a request to receive the extended data unit, the extended data unit by utilizing extended data unit retrieval information from the mapping data structure;
extracting from the extended data unit at least one updated portion pointed by the updated portion retrieval information; and
retrieving the updated portion using the updated portion retrieval information.

15. A non-transitory computer readable medium that stores instructions that once executed by a processor of a storage system cause the processor to:
receive an updated portion of a data unit, the data unit is associated with multiple members of a snapshot family that includes a source volume and one or more snapshots; wherein the updated portion is smaller than a granularity of a mapping data structure used for retrieval of the data unit;
create an extended data unit that comprises (i) an original content of the data unit, (ii) the updated portion and, (iii) updated portion metadata; wherein the updated portion metadata comprises (a) updated portion retrieval information for retrieving the updated portion, and (b) updated portion snapshot information indicative of at least one member of the multiple members of the snapshot family that is associated with the updated portion;
receive a request to read a certain data unit of a certain member of the snapshot family;
in response to receiving the request to read the certain data unit:
retrieve a certain extended data unit that corresponds to the certain data unit and comprises updated portions associated with different members of the snapshot family;
select at least one of the updated portions, wherein the selecting is based on an updated portion snapshot information of the at least one of the updated portions; wherein the updated portion snapshot information of the at least one of the updated portions is indicative of the certain member of the snapshot family; and
create the certain data unit by using the at least one of the updated portions.

16. A non-transitory computer readable medium that stores instructions that once executed by a processor of a storage system cause the processor to:
receive an updated portion of a data unit that is associated with multiple members of a snapshot family that includes a source volume and one or more snapshots; wherein the updated portion is smaller than a granularity of a mapping data structure used for retrieval of the data unit;
select whether to include the updated portion in an extended data unit or in an updated data unit, based on a size of the updated portion,
create, if selecting to include the updated portion in the extended data unit, the extended data unit, wherein the extended data unit comprises (i) an original content of the data unit, (ii) the updated portion, and (iii) updated portion metadata, wherein the updated portion metadata comprises (a) updated portion retrieval information for retrieving the updated portion, and (b) updated portion snapshot information indicative of at least one member of the multiple members of the snapshot family that is associated with the updated portion; and
wherein if selecting to include the updated portion in the updated data unit, then:
create an updated data unit by replacing a previous portion of the data unit by the updated portion; and
participate in storing both the updated data unit and an original data unit that comprises the original content of the data unit and does not include any updated portion;
receive a request to read a certain data unit of a certain member of the snapshot family;
in response to receiving the request to read the certain data unit:
retrieve a certain extended data unit that corresponds to the certain data unit and comprises updated portions associated with different members of the snapshot family;
select at least one of the updated portions, wherein the selecting is based on an updated portion snapshot information of the at least one of the updated portions; wherein the updated portion snapshot information of the at least one of the updated portions is indicative of the certain member of the snapshot family; and
create the certain data unit by using the at least one of the updated portions.

17. A storage system comprising a processor and a permanent storage layer;
wherein the processor is arranged to receive an updated portion of a data unit, the data unit is associated with multiple members of a snapshot family that includes a source volume and one or more snapshots; wherein the updated portion is smaller than a granularity of a mapping data structure used for retrieval of the data unit; and to create an extended data unit that comprises (i) an original content of the data unit, (ii) the updated portion and, (iii) updated portion metadata; wherein the updated portion metadata comprises (a) updated portion retrieval information for retrieving the updated portion, and (b) updated portion snapshot information indicative of at least one member of the multiple members of the snapshot family that is associated with the updated portion; wherein the permanent storage layer is arranged to store the extended data unit;
wherein the processor is arranged to receive a request to read a certain data unit of a certain member of the snapshot family; and in response to receiving the request to read the certain data unit: retrieve a certain extended data unit that corresponds to the certain data unit and comprises updated portions associated with different members of the snapshot family; select at least one of the updated portions, wherein the selecting is based on an updated portion snapshot information of the at least one of the updated portions; wherein the updated portion snapshot information of the at least one of the updated portions is indicative of the certain member of the snapshot family; and create the certain data unit by using the at least one of the updated portions.

18. A storage system comprising a processor and a permanent storage layer;
wherein the processor is arranged to receive an updated portion of a data unit that is associated with multiple members of a snapshot family that includes a source volume and one or more snapshots; wherein the updated portion is smaller than a granularity of a mapping data structure used for retrieval of the data unit; select whether to include the updated portion in an extended data unit or in an updated data unit, based on a size of the updated portion; create, if selecting to include the updated portion in the extended data unit, the extended data unit, wherein the extended data unit comprises (i) an original content of the data unit, (ii) the updated portion, and (iii) updated portion metadata, wherein the updated portion metadata comprises (a) updated portion retrieval information for retrieving the updated portion, and (b) updated portion snapshot information indicative of at least one member of the multiple members of the snapshot family that is associated with the updated portion; wherein the permanent storage layer is arranged to store the extended data unit;

wherein if selecting to include the updated portion in the updated data unit, then the processor is arranged to create an updated data unit by replacing a previous portion of the data unit by the updated portion; and wherein the permanent storage layer is arranged to store both the updated data unit and an original data unit that comprises the original content of the data unit and does not include any updated portion;

wherein the processor is arranged to receive a request to read a certain data unit of a certain member of the snapshot family; and in response to receiving the request to read the certain data unit: retrieve a certain extended data unit that corresponds to the certain data unit and comprises updated portions associated with different members of the snapshot family; select at least one of the updated portions, wherein the selecting is based on an updated portion snapshot information of the at least one of the updated portions; wherein the updated portion snapshot information of the at least one of the updated portions is indicative of the certain member of the snapshot family; and create the certain data unit by using the at least one of the updated portions.

* * * * *